Aug. 5, 1969
H. J. EVANS ET AL
3,460,031
MICROWAVE WAVEGUIDE MOISTURE MEASUREMENT
Filed June 8, 1966
2 Sheets-Sheet 1
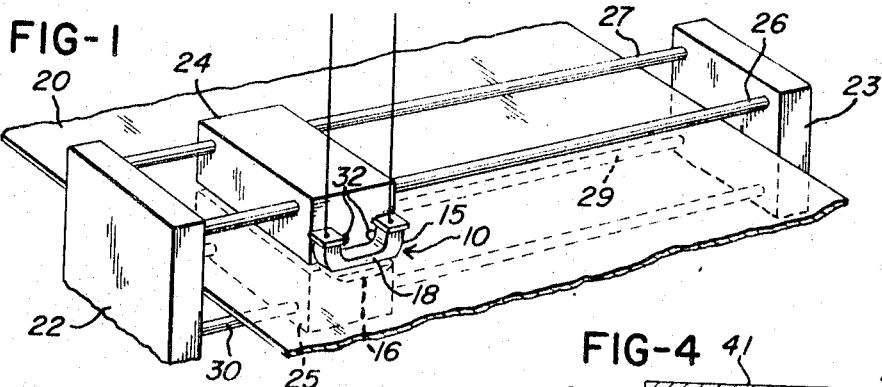
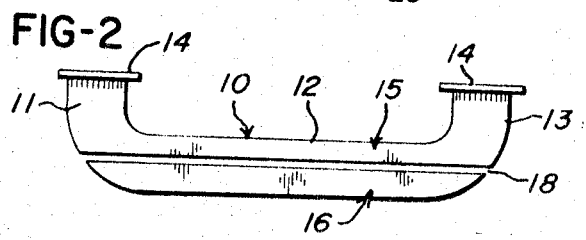
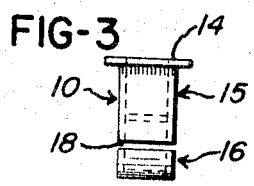
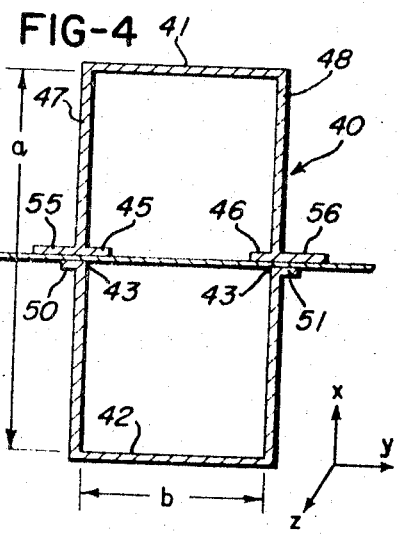
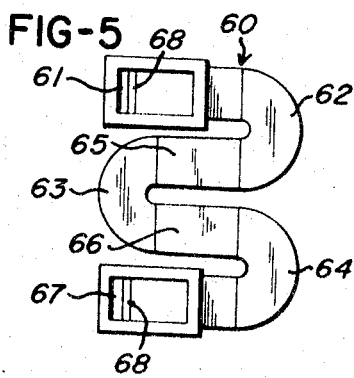
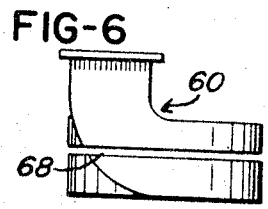
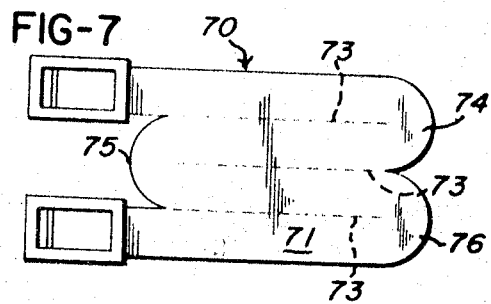
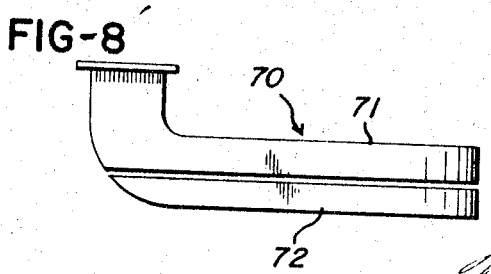
INVENTORS
HOWARD J. EVANS &
WENDELL H. CORNETET, JR.
BY
*Marshal, Biebel, French & Bugg*
ATTORNEYS Aug. 5, 1969  H. J. EVANS ET AL  3,460,031
MICROWAVE WAVEGUIDE MOISTURE MEASUREMENT
Filed June 8, 1966  2 Sheets-Sheet 2
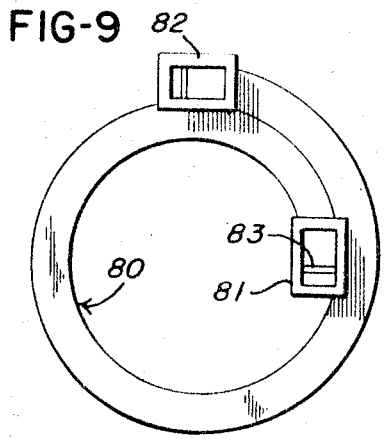
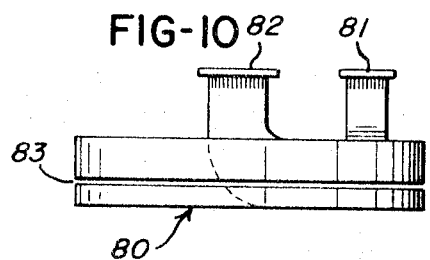
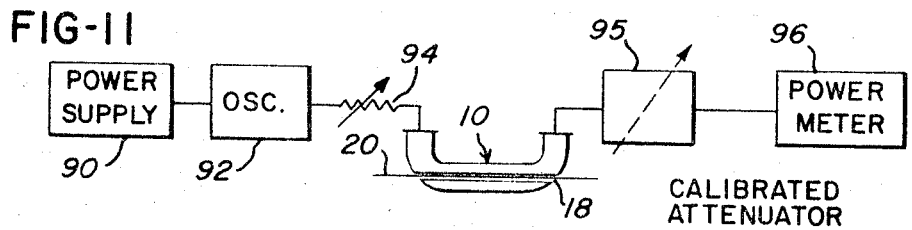
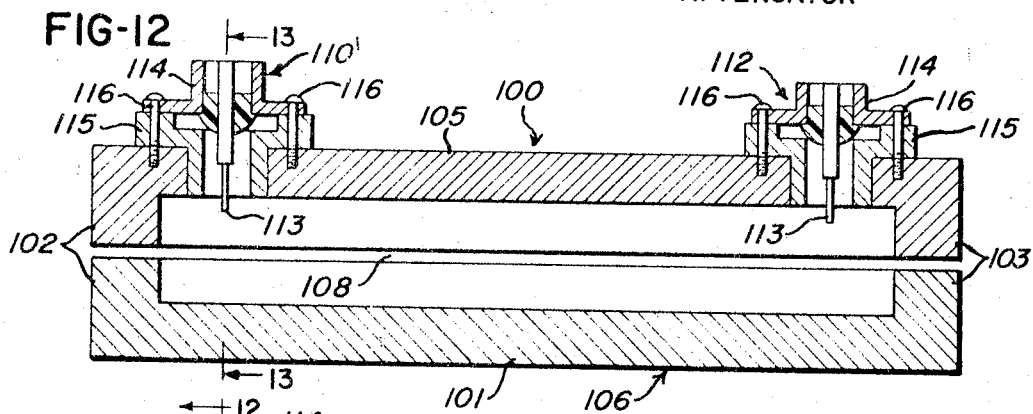
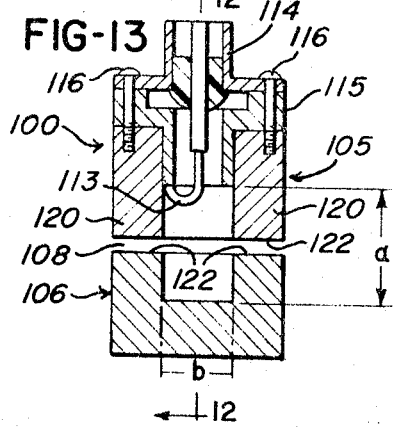

United States Patent Office 3,460,031
Patented Aug. 5, 1969

3,460,031
MICROWAVE WAVEGUIDE MOISTURE
MEASUREMENT
Howard J. Evans and Wendell H. Cornetet, Jr., Columbus, Ohio, assignors to Industrial Nucleonics Corporation, a corporation of Ohio
Filed June 8, 1966, Ser. No. 556,224
Int. Cl. G01r 27/04; H01p 3/20
U.S. Cl. 324—58.5                      22 Claims

ABSTRACT OF THE DISCLOSURE

Microwave wave guide moisture measuring probes are formed in two halves which are split or separated through a neutral current axis longitudinally of the probe and positioned in superimposed relation to define a slot through which sheet material may be passed for measurement of microwave attenuation. Both non-resonant and resonant such probes are disclosed, and embodiments of the probes are formed with folds, wraps and bends to increase the interaction with the web. The probe walls, at the slot, are flanged or formed with a thickness sufficient to make the probe relatively insensitive to slight misalignment in a traversing structure.

---

This movement relates to the measurement of moisture by microwave techniques, and more particularly to apparatus for measuring moisture content, on line, in a moving web of material.

While the description herein is evolved around the correlation of a dielectric loss due to moisture in the sheet, the same equipment can be used t measure the dielectric loss due to any lossy constituent within the sheet as long as this loss mechanism exhibit an appreciable effect within the frequency band covered. All that is required is that the constituent in the dielectric to be measured produce a change in impedance in the dielectric which may be associated with the magnitude of the constituent. At microwave frequencies, a change in impedance in a dielectric is usually associated with a change in the percentage composition or with a temperature change which changes the relative electrical properties of the dielectric. Materials such as water and some organic additives with large permanent or induced electric dipoles produce large changes in the impedance of the dielectric at microwave frequencies. Loss factors become high if the resonant frequency of the measured constituent is near the applied microwave frequency.

The invention is particularly directed to the measurement of a lossy constituent in sheet material, such as the measurement of moisture content in a moving web of paper. Microwave techniques are particularly applicable to the measurement of water content since water exhibits a relatively high loss factor at microwave frequencies. The loss due to moisture sufficiently exceeds the losses due to the affects of paper composition and temperature, so that these may be either ignored or suitably accounted for, and the total loss in microwave signal may be used as a measurement of the actual moisture content. Further, microwave measurements of moisture are relatively unaffected by layer effect, such as encountered in kraft papers and the like, in which the concentration or density of moisture is not uniform through the thickness of the paper. This condition results, for example, following an on-line liquid coating station, at which the web material may be coated on one or both of its surfaces.

While the moisture content may be measured in samples of sheets by inserting the sheets within a slot formed in a wave guide, and measuring the attenuation to the microwave signal, the slotted wave guide has found little practical acceptance in commercial on-line measurements due to the impracticability of providing a slot of sufficient width to accept a web of paper in the usual on-line widths. Furthermore, measurement simultaneously across the entire width of a moving web is frequently not preferred or desired. Rather, more meaningful data may be obtained by measuring the moisture content at selected transverse locations of the web or by making continuous measurements by scanning transversely of the width of the web in order to provide a profile of moisture content.

This invention has as one of its objects the provision of microwave apparatus in which a microwave probe is formed in two separate sections with one of the sections mounted so that it may be positioned on one side of a moving web of material and the other section so mounted that it may be positioned opposite to that of the first section on the other side of the web. Preferably, the apparatus includes traversing structure by which the separate probe sections are caused to traverse the web while maintaining a predetermined relationship to each other. The attenuation of a microwave signal affected by material passing between the probe sections is then measured as an indication of the moisture content of the material.

The invention further has as one of its objects the provision of a microwave probe which is configured and frmed so as to reduce the necessity for maintaining the separate probe sections in precise alignment during traversing movement to prevent what could otherwise result in false signals due to variations in alignment.

A more specific object of this invention is the provision of a probe which is particularly adapted for use in making profile measurements of moisture content in a moving web of sheet material.

A still further object of this invention is the provision of a moisture sensor including a probe which permits small relative motion to exist between separate top and bottom sections of the probe without adversely affecting the intensity of the electric field interacting with a web of sheet-like material between the probe sections.

Another object of the invention is the provision of a probe which is divided into two sections which are mechanically separate from each other and in which at least one of the sections is flanged or is formed with a thick wall section at the slot to increase the fill factor and to provide a uniform field across the slot of the probe, which field is relatively unaffected by slight variations in the relative positions of the probe sections as the probe is caused to traverse the width of a running web of material.

A particular advantage of the apparatus of this invention is that it results in a relatively closed system in which there is little or no external radiation by the sections of the wave guide probe through this slot.

It is also a particular object of this invention to provide a microwave moisture detector probe, as outlined above, in which the interaction with the web is increased without substantially increasing the width of the probe. This may be accomplished by folding, bending or wrapping a wave guide probe around or upon itself or by increasing the electric field in the probe by making the probe resonant.

A more specific object of this invention is the provision of a split microwave probe which is resonant in order to increase the interaction of the electrical field with the material passing between the probe sections.

A further object of this invention is the provision of a resonant probe, as outlined above, in which the electric signal changes as to attenuation and resonant frequency, and the Q of the probe, may each be measured independently or together in order to provide a reliable indication of the moisture content of a web passing between the probe sections.

A still further object of this invention is the provision of a microwave probe which has wall members formed of relatively thick cross-section in order to strengthen the probe, to reduce radiation through the probe slot, and to reduce the affects of slight variations in the relative positions of the separate probe sections.

These and other objects and advantages of the present invention will become apparent from the following description, the accompanying drawings and the appended claims.

In the drawings—

FIG. 1 is a perspective view showing the application of a microwave probe of this invention to a traversing mechanism for on-line measurements of moisture content in a moving web of paper or the like;

FIG. 2 is a side elevation of one form of a split wave guide probe constructed according to this invention;

FIG. 3 is an end elevation of the probe of FIG. 2;

FIG. 4 is an enlarged vertical section through a modified wave guide probe constructed according to this invention;

FIG. 5 is a plan view of a split-folded probe constructed according to this invention;

FIG. 6 is a side elevation of the probe of FIG. 5;

FIG. 7 is a plan view of a modified form of a split and folded probe constructed according to this invention;

FIG. 8 is a side elevation of the probe of FIG. 7;

FIG. 9 is a plan view of a further modification of a probe made according to this invention;

FIG. 10 is a side elevation of the probe of FIG. 9;

FIG. 11 is a diagram showing suitable instrumentation which may be used with the probes of this invention and with the apparatus of FIG. 1 for on-line measurements of moisture content in the moving web;

FIG. 12 is a vertical longitudinal sectional view through a resonant probe constructed according to this invention looking generally along the lines 12—12 of FIG. 13; and FIG. 13 is a vertical transverse section taken generally along the lines 13—13 of FIG. 12.

The microwave probes of this invention are the confined field type in order to achieve high interaction of the electric energy passing through the probe with a web or sheet of material, the moisture content of which is to be measured, thereby eliminating many of the affects of stray fields. The probes are adapted for use in the microwave range. This range is not distinctly defined, but is generally accepted as lying between the range of 1000 to 23,000 megacycles. A hollow section of rectangular wave guide is preferably used in which the longer dimension $a$ in the X direction is twice that of the smaller dimension $b$ in the Y direction (FIG. 4).

It is also desirable to operate the probe in one mode only, and for the purposes of the following description of the preferred embodiments of this invention, it is assumed that a rectangular wave guide is operated in the $TE_{10}$ mode. In this mode, the regions of maximum electric current are along the wave guide walls at $b/2$ while the regions of greatest electric field are through the center of the wave guide in a plane including $a/2$. Therefore, a section of wave guide can be split longitudinally along the Z axis through a neutral current axis in the region of greatest electric field to form a probe consisting of mechanically separate upper and lower sections, without adversely affecting the wave guide as a microwave conductor. Such a split is through the wave guide walls at the regions of least current flow. Accordingly, the wave guide may be divided into such separate upper and lower portions, and may be therefore employed as a probe with the separate portions being independently supported such as for traversing movement across the width of a web of paper for example.

Referring more particularly to FIG. 2, a rectangular wave guide probe 10 is shown having a curved inlet portion 11, an intermediate straight portion 12, and a curved outlet portion 13. The inlet and outlet portions are suitably formed with connecting flanges 14 for joining with the connecting flanges of suitable microwave transmission lines. Alternately, coaxial coupling may be used. The probe is rectangular in cross-section at the intermediate portion 12. Further, the probe 10 is split along a transverse plane extending through the inlet and outlet portions and through the center of the longer walls of the straight section 12. The probe is therefore split through the region of maximum electric field and minimum electric current, to form an upper probe section 15 and a separate lower probe section 16. When the probe sections are supported in superimposed relation, as shown in FIG. 2 there is defined a slot 18 therebetween, extending completely through the probe.

The probe 10 may accordingly be employed as a practical device for measuring water content in a moving paper web, such as in the web 20 of FIGS. 1 and 4, since measurements may be made of the attenuation of the microwave signal at a single frequency, and the phase changes may be ignored. Therefore, the electrical phase variations which may result by reason of the bends in the probe, the slot 18, or other physical characteristics, are generally constants and remain so during use, and can therefore be suitably accounted for, or in some cases, ignored.

Traversing means for causing the separate probe sections to traverse together across the width of the web 20 while maintaining a predetermined aligned relationship between the probe sections may consist of apparatus such as shown generally in FIG. 1, as including a pair of spaced apart, upright end stands 22 and 23 positioned at opposite sides of the moving web 20. The traversing mechanism may be one which is employed with a beta ray thickness gauge and includes an upper head 24 which supports one of the probe sections, such as the section 15, and a lower head 25 which supports the lower section 16. The head 24 is guided for transverse tracking movement on a pair of parallel, spaced-apart rods 26 and 27 extending rigidly between the end stands 22 and 23.

Similarly, the lower head 25, which supports the opposed section 16 of the probe, is mounted for traversing aligned movement on guide rods 29 and 30. Since the lower section is passive in operation, there is no need for any electrical connections or other instrumentation connected with it.

The probe sections 15 and 16 may be attached for movement with the transversing heads as by welding or attachment to suitable lugs 32 shown in FIG. 1. On the other hand, the probe sections may be supported directly in the heads or may form an integral part of the heads where a moisture probe is to be used separate or apart from other measuring equipment.

The traversing structure shown in FIG. 1 is sometimes referred to as on O bracket, and may be constructed generally as shown in the U.S. patent of Scholaechter 3,125,680 of 1964, assigned to the same assignee as this invention. However, for installations where the width of the web 15 is not excessive, a U bracket structure may be employed of the type shown in the U.S. patent of Hickman et al. 3,007,052 of 1961, also assigned to the same assignee of this invention.

The probe 10 is substantially narrower than the width of the web 20 to be measured, and permits measurements to be made of localized portions of the web across the total width thereof. When the wave guide structure supported as described above is caused to traverse the width of the web 20, continuous measurements of moisture content in the web may be made at transverse positions across the width of the web, and a profile of such moisture content may be plotted.

It is important that the superimposed upper and lower sections be maintained in relative alignment during traversing movement. The effects of misalignment in the X direction may be minimized by causing the wave guide sections to be maintained in close proximity to the upper and lower surfaces of the web 20, and the sections may, in some instances, be permitted to bear upon the web surface. Slight misalignments or variations in the Z direction have not been found to be as critical as corresponding variations in the Y direction. However, uncontrolled excessive variations in either the X or Y direction may result in unacceptable changes in the electric field at the slot, and therefore changes in the attenuation of such signal due to moisture in the web.

In FIG. 4 there is shown an enlarged vertical section through a split wave guide probe 40 which has been modified to eliminate many of the adverse affects of variation in probe alignment during traversing movement, such as may be the result of temperature changes, wear of the parts, or deflections due to external forces. The probe 40 is formed with an upper wave guide section 41 and a lower section 42 defining therebetween a slot 43 which is mid-way between the inside dimension $a$ of the longer or wider side walls. One of the sections, such as the section 41, is formed with a pair of flanges 45 and 46 which extend transversely inwardly from the walls 47 and 48 of the wave guide at the slot 43. The flanges 45 and 46 extend effectively the length of the slot 43 in the Z direction. The flanges are positioned in the region of greatest electric field and have the effect of decreasing the impedance and increasing the capacitance across the narrow inside dimension $b$ of the wave guide, thereby increasing the intensity of the electric field at the slot 43. Therefore, the flanges 45 and 46 increase the fill factor of the probe, and increase the amount of electric energy which interacts with the web 20 at the slot 43.

Slight variations in the Y direction between the wave guide sections 41 and 42 will not result in any substantial change in the electric field intensity, since the minimum spacing between the side walls is represented by the inner edges of the flanges 45 and 46, and this remains constant. It has been found that flanges 45 and 46 which each extend into the inside of the cavity a distance of approximately $b/20$ are effective where $b$ is the narrow inside dimension of a rectangular wave guide. The flanges 45 and 46 accordingly have the effect of causing a greater proportion of energy going down the wave guide to interact with the web 20 at the region of the slot 43, while the electric field remains substantially constant with variations of the relative positions of the portions 41 and 42 in the Y direction.

The probe may be provided with further flanges for increasing the capacitive coupling between the sections 41 and 42. For this purpose, the corresponding walls 47 and 48 of the lower section 42 may be provided with flanges 50 and 51, which may extend outwardly of the guide walls the same extent as the flanges 45 and 46 extend inwardly of the walls. In addition, the section 41 may be formed with complementary outwardly directed flanges 55 and 56, each of which may be $b/10$ in length, or twice that of the flanges 50 and 51. The flanges 50 and 51 in juxtaposition with the flanges 55 and 56 increase the capacitance and coupling between the respective sections and further increase the electric field intensity across the inwardly directed flanges 45 and 46 on the portion 41. Since the internal dimensions of the top and bottom sections are not identical, due to the presence of the inwardly directed flanges 45 and 46, some current will flow between the flanges 50 and 51 on the wave guide section 42 and the cooperating flanges on the wave guide section 41. The flanges 50 and 51 therefore provide a low impedance path between the wave guide sections, and are helpful to the operation of the wave guide as a probe.

In many instances, it is desirable to increase the effective length of the wave guide probe to increase the interaction of the electrical energy with the web 20 over a small transverse portion of the web. Accordingly, it may be desirable to fold the probe back upon itself in serpentine-like manner as shown, for example, in FIGS. 5 and 6 forming parallel adjacent courses and connected alternate ends. Here, a split wave guide probe 60 is shown as including a flanged curved inlet 61, and a series of 180° elbows or U-bends 62, 63 and 64, with intermediate straight courses or sections 65 and 66 leading to a flanged outlet 67. The probe 60 may be formed with flanges at the slot 68, in the manner described in connection with the embodiment shown in FIG. 4. While the abrupt bends in the probe shown in FIGS. 5 and 6 may insert certain phase changes in the signal between the inlet 61 and the outlet 67, these changes may be considered as constants and do not adversely affect the operation of the wave guide sections as a probe, when measurements of attenuation, only, are made.

Another embodiment of a split-folded probe is shown at 70 in FIGS. 7 and 8. The probe 70 has the same general arrangement as that of the probe 70 of FIGS. 5 and 6, but is more compact in that the parallel courses are confined within a unitary structure. This structure includes common top and bottom plates 71 and 72, and and internal wall sections 73 extend between the top and bottom plates and form a common partition separating the adjacent wave guide sections. The internal wall sections 73 terminate in spaced relation to curved ends 74, 75, and 76 forming a labyrinth or serpentine-like continuous folded wave guide therein.

FIGS. 9 and 10 represent a further embodiment of a split probe in which a wave guide 80 is formed as a continuous spiral leading from an inlet 81 to an outlet 82. The spiral probe 80 is again split in upper and lower halfs defining a slot 83 therebetween. The embodiment of FIGS. 9 and 10 may have some advantage in reducing the voltage-standing-wave-ratio, as compared to the probes 60 and 70 which have more abrupt bends.

Referring to FIG. 11, a circuit suitable for use with any of the probes of this invention is diagrammatically shown as including a power supply 90 which supplies power for a pulsed microwave oscillator 92. The oscillator 92 may have, for example, a repetition rate of 1,000 c.p.s., although other pulse rates or continuous wave oscillators may be employed. The probe, such as the probe 10, for example, is connected to the oscillator 92 through an isolator 94.

The outlet connection of the probe may be connected to a suitable power meter through a calibrated attenuator 95. The attenuator 95, is, in effect, an energy absorbing detector which is reasonably wavelength independent. The attenuator 95 is preferably variable to provide a constant reading at a power meter 96, with the adjustment or degree of movement of the attenuator being read as an indication of the moisture content in the web 20. Alternatively, a fixed matched load may be used with a calibrated power meter, and the meter read as an indication of attenuation.

The circuit arrangement described is preferred to that of a voltage-standing-wave-ratio detector since it is relatively unaffected by changes in phase and wave length. However, it is within the scope of this invention to use a VSWR meter connected to a standing wave indicator, for indicating the degree or amount of signal attenuation in the probe.

It is also within the scope of this invention to use a resonant microwave probe in order to increase the strength of the electrical field within a given area and to increase the sensitivity of the probe to loss due to the material in the slot. In FIGS. 12 and 13 there is shown a twoport resonant probe 100 which includes a straight section of wave guide 101 which is short-circuited by means of integral end plates or members 102 and 103. As in the probes described above, the probe 100 is split through its neutral axis to form an upper probe section 105 and a separate lower section 106 defining a slot 108 extending therebetween.

The probe 100 acts as a resonator and may be considered as a transmission line which is short-circuited at both ends. It has a length along the Z axis equal to integral multiples of a half wave length at the excitation frequency. When excited, the electro-magnetic waves bounce back and forth between the ends 102 and 103. Accordingly, the probe has an effective length longer than that of the non-resonant probes previously described, and, for example, a 5:1 reduction in overall length can be achieved. The microwave probe 100 is therefore a two-port resonator having an input coupling 110 and an output coupling 112. These couplings are shown as having loops 113 connected through N type coaxial connectors 114 to suitable coaxial transmission lines (not shown). The connectors 114 are mounted to the probe 100 on spacers 115 and are retained by screws 116. Alternatively, small hole or iris coupling to a wave guide may be used.

The size of the loop 13 is not critical, but is preferably formed as a small fraction of awave length. The loops 113 are preferably mounted so that the axis of the loop can be rotated within the interior of the wave guide section 101 to change the coupling, as desired. This has the same effect as changing the size of the loop 113.

As shown in FIG. 13, all of the walls of the wave guide are formed with a thickness which is substantial as compared to the narrower inside dimension $b$ of the probe. Therefore, the opposite sections of the wave guide side walls 120 at the slot 108 form opposed lips or surfaces 122 (FIG. 13) which have a substantial width as compared to that of the normal thin-wall wave guide, and may be in the order of one-half inch, for example, in an X-band probe.

The thick wall construction has been found to have several advantages: First, the probe has substantial strength, adapting it for use in an industrial environment, in which it may be subjected to large mechanical forces, such as may occur when the web breaks. Second, the thick wall sections form the electrical equivalent of flanges at the slot 108, making the probe substantially less sensitive to misalignments in either the X-Z plane. Third, due to the width of the walls, the surfaces 122 forms a wave guide operating below the cutoff frequency of the probe, and the microwaves are effectively prevented from escaping or radiating through the slot 108. As a result, relatively wide slot widths up to and in the neighborhood of ¼ inch can be obtained with X-brand probes made according to this invention. This has advantage when measuring moisture content of heavy stock or board.

The thick walls 120 of FIGS. 12 and 13 for some purposes, may be considered as the equivalent of the flanges of FIG. 4, and therefore, each embodiment may be considered as having means in at least one of the probe sections defining a lip at the respective slot which is substantial in width as compared to the shorter inside dimension $b$ of the wave guide section, for reducing the changes in the microwave signal due to variations in the alignment of the probe sections.

The resonant probe 100 has additional advantages in providing versatility of measurements. Attenuation may be directly measured as a function of the increase in weight of the web due to moisture content, in the manner described above. Also, when a lossy material is inserted, the resonant frequency shifts to a lower frequency, and the Q of the probe decreases. Both of these changes may be measured, and comparisons made relative to the empty probe, and calibration curves obtained. The decrease in resonant frequency and the decrease in Q may be plotted as a function of the moisture content of the web of paper, and used either for direct measurement of moisture or as a cross-check against an attenuation measurement.

In any of the probes described above, it may be desirable to fill the internal cavity with a good quality dielectric, in order to reduce the collection of lossy foreign material inside the probe. Hard metal faces may be employed on the probe walls in the slot or gap area in order to reduce probe wear.

It is also within the scope of this invention to employ coaxial line coupling loops or straight probe coupling with any of the embodiments described above in which wave guide direct coupling is shown, as well known in the art, providing means for applying a microwave signal to the probe and for measuring the change or changes in such signal. Also, while the embodiments shown include an upper active section and a lower passive section, it is within the scope of this invention to connect the inlet to either the upper or lower section only and to connect the outlet to the other section, in installations where this would be more convenient or desirable.

In the description of the invention herein, major emphasis has been placed upon the measurement of a moisture constituent in a dielectric, such as a web of paper. However, it is to be understood that all that is required is that the constituent involved produces a measurable change in impedance in the dielectric at the microwave frequencies. Accordingly, other substances may be measured which have sufficiently large permanent or induced electric dipoles and produce measurable changes in the impedance of the dielectric at the microwave frequencies.

It will therefore be seen that this invention provides microwave probes which are particularly adapted for online moisture measurements and the like, in combination with traversing structure, and when supported in superimposed relation, form a length or section of a microwave transmission line defining a slot which extends transversely completely through the probe substantially at its neutral axis.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for measuring the content of a constituent which exhibits changes in the impedance of a dielectric material at microwave frequencies at transversely spaced locations across a moving web of such dielectric material, comprising a microwave probe including a first portion, a cooperating second portion separate from said first portion which, when supported in superimposed relation to said first portion, forms a length of hollow microwave transmission line having means defining a slot extending therebetween, said slot being positioned along a plane dividing said first and second portions and passing generally through a neutral current axis of said transmission line, said probe having a width transverse to the direction of web movement forming a small part of the total width of such web, means mounting said first and second probe portions in said superimposed relation and providing for traversing movement thereof in said superimposed relation across such web, with such web extending through said slot, means applying a microwave signal to said probe, and means connected to said probe responsive to a change in said microwave signal in said probe as an indication of the content of said constituent in such web.

2. The apparatus of claim 1 in which said probe comprises a length of non-resonant wave guide.

3. The apparatus of claim 1 in which said probe is terminated to resonate at the frequency of said microwave signal.

4. The apparatus of claim 1 in which all of the electrical connections are made in one of said probe portions, and in which the other of said probe portions is electrically passive.

5. The apparatus of claim 1 in which said probe is formed of a length of rectangular wave guide material with said slot lying along a plane which passes midway between the length of the wider of the walls thereof.

6. The apparatus of claim 5 comprising a pair of inwardly directed flanges formed on one of said portions adjacent said slot and cooperating with the other of said portions for increasing the fill factor at said slot and reducing the affect on said microwave signal of relative movement between said portions.

7. The apparatus of claim 1 in which said portions form a circuitous path increasing the effective length of the probe and the interaction of said slot with said web and maintaining the width thereof transverse of such web sufficiently small for effective profile measurements.

8. The apparatus of claim 7 in which said probe consists of parallel adjacent courses having connected alternate ends to form a compact serpentine-like transmission line.

9. The apparatus of claim 6 in which said probe is formed in a curved loop of wave guide.

10. The apparatus of claim 1 in which said length of transmission line is resonant having short circuiting plates terminating the ends thereof, said plates being spaced from each other by integral multiples of half-wave lengths at the excitation frequency.

11. Apparatus for measuring moisture content at transversely spaced locations across a moving web of material containing moisture, comprising a microwave probe including a first portion, a cooperating second portion separate from said first portion which, when supported in superimposed relation to said first portion, forms a section of hollow microwave transmission line having means defining a slot extending therebetween, said slot being positioned generally along a plane dividing said first and second portions and passing through a neutral current axis of said transmission line, means mounting said first and second probe portions in said superimposed relation for traversing movement across the width of the web with the web extending through said slot, means applying a microwave signal to said probe section, and means connected to said probe section for measuring the attenuation of the microwave signal in said probe by moisture in the web.

12. The measuring apparatus of claim 11 in which each of said probe portions has a width in the direction of web movement forming a small part of the total width of the web.

13. An improved microwave probe for use with on-line measuring apparatus in which a change effected in a microwave signal is measured as an indication of the content of a lossy constituent at microwave frequencies in a web of paper or the like, comprising a section of rectangular wave guide transmission line divided longitudinally through the longer walls thereof into two separate portions including a first portion adapted to be positioned on one side of such web and a second portion mechanically independent of said first portion adapted to be positioned on the other side of such web in superimposed relation to said first portion and defining therebetween a slot through which such web may freely pass, and means in at least one of said portions defining a lip at said slot which is substantial in width compared to the shorter inside dimension of said transmission line section for reducing the affects on said microwave signal due to variations in the alignment of said probe portions with respect to each other.

14. The probe of claim 13 further comprising end plate shorting means terminating said transmission line section for resonance at discrete microwave frequencies for increasing the interaction of the electostatic field in said slot with such web.

15. The probe of claim 13 in which said probe walls are formed of a material having a thickness which is substantial as compared to the narrower inside dimension of the probe and defining a gap at said slot which forms a waveguide operating below the cutoff frequency of said probe preventing radiation from said slot.

16. The probe of claim 13 further comprising means on at least one of said portions forming opposite, inwardly turned flanges adjacent said slot providing an increase in the intensity of the electric field therebetween and reducing the affects of slight variations in alignment of said portions in a direction transverse to the direction of wave propagation.

17. The probe of claim 16 in which the flanges on said one portion extend inwardly a distance of approximately 1/20 the width of said waveguide transmission line across the narrow dimension thereof.

18. The probe of claim 16 in which said one guide portion is formed with a further pair of flanges extending outwardly of said inwardly directed flanges, and the other of said probe portions is provided with a pair of flanges positioned oppositely of said further pair of flanges at said slot for increasing the capacitive coupling between said guide portions.

19. A microwave moisture probe for measuring the moisture content in a moving web of paper or the like comprising a hollow waveguide divided into an upper section and a separate lower section substantially through the region of highest electric field and lowest current defining therebetween a slot adapted to receive said web therethrough, means mounting said waveguide sections in superimposed relation to each other and for causing said sections to tranverse together across the width of such web, means applying a microwave signal to one end of said wave guide, means connecting substantially at the opposite end of said guide measuring the attenuation of said signal in said waveguide, and means on at least one of said waveguide sections defining flanges along opposite longitudinal edges thereof adjacent said slot extending inwardly toward each other providing an increased fill factor at said slot and decreasing the sensitivity of the probe to slight changes in alignment between said waveguide sections during said traversing movement.

20. The probe of claim 19 in which the other section is also formed with longitudinal extending flanges at said slot cooperating with the said flanges of said one section and increasing the capacitive coupling between said sections.

21. The probe of claim 19 in which said flanges extend inwardly toward each other a distance approximately equal to 1/20 of the width of said guide at said slot.

22. The probe of claim 19 in which said one section is further formed with a pair of outwardly directed flanges at said slot which extend a distance of approximately 1/10 of said width of said guide measured from said guide walls.

References Cited

UNITED STATES PATENTS

| | | | |
|---|---|---|---|
| 2,548,598 | 4/1951 | Feiker | 324—58.5 |
| 2,659,860 | 11/1953 | Breazeale | 324—58.5 |
| 3,079,551 | 2/1963 | Walker | 324—58.5 |
| 3,240,995 | 3/1966 | Morris | 324—58.5 X |

FOREIGN PATENTS

| | | |
|---|---|---|
| 1,006,523 | 10/1965 | Great Britain. |
| 1,372,886 | 8/1964 | France. |
| 956,445 | 1965 | Great Britain. |

RUDOLPH V. ROLINEC, Primary Examiner

P. F. WILLE, Assistant Examiner

U.S. Cl. X.R.

333—98

UNITED STATES PATENT OFFICE
CERTIFICATE OF CORRECTION

Patent No. 3,460,031          Dated August 5, 1969

Inventor(s) Howard J. Evans

It is certified that error appears in the above-identified patent and that said Letters Patent are hereby corrected as shown below:

Column 1, line 28, "movement" should read ---invention---; line 34, "t" should read ---to---; line 36, "exhibit" should read ---exhibits---.

Column 2, line 26, "frmed" should read ---formed---.

Column 4, line 52, "on" should read ---an---; line 53, "Scholaechter" should read ---Schlaechter---.

Column 6, line 65, "twoport" should read ---two-port---.

Column 7, line 14, "13" should read --113---; line 15, "awave" should read ---a wave---; line 42, "X-brand" should read ---X-band---.

Signed and sealed this 25th day of January 1972.

(SEAL)
Attest:

EDWARD M. FLETCHER, JR.
Attesting Officer

ROBERT GOTTSCHALK
Commissioner of Patents